United States Patent [19]
de la Faille

[11] 3,951,392
[45] Apr. 20, 1976

[54] HYDRO-PNEUMATIC SPRING
[75] Inventor: Jacob Baart de la Faille, Delft, Netherlands
[73] Assignee: Nederlandse Organisatie voor Toegepast Natuurwetenschappelijk Onderzoek Ten Behoeve Van Nijverheid, Handel en Verkeer, The Hague, Netherlands
[22] Filed: June 28, 1974
[21] Appl. No.: 484,106

[30] Foreign Application Priority Data
July 4, 1973  Netherlands.................. 7309301

[52] U.S. Cl................................. 267/64 R; 267/8 A
[51] Int. Cl.²........................................ F16F 5/00
[58] Field of Search......................... 267/64 R, 8 A

[56] References Cited
UNITED STATES PATENTS

| | | |
|---|---|---|
| 3,070,363 | 12/1962 | Ellis, Jr.............................. 267/8 A |
| 3,480,269 | 11/1969 | Jewell et al........................ 267/64 R |
| 3,790,146 | 2/1974 | Hoffmann.......................... 267/64 R |
| 3,860,225 | 1/1975 | Nakamura.......................... 267/64 R |

Primary Examiner—James B. Marbert
Attorney, Agent, or Firm—Hammond & Littell

[57] ABSTRACT

A hydropneumatic spring which comprises a plunger-cylinder assembly and a reservoir connected with the cylinder and which, for its level control, is provided with means for a substantially constant liquid supply and with a discharge throttling opening that varies with the position of the plunger in the cylinder. The plunger is supported in the cylinder by means of hydrostatic bearings which employ the supply and the discharge pressure of the liquid flow through the spring.

7 Claims, 1 Drawing Figure

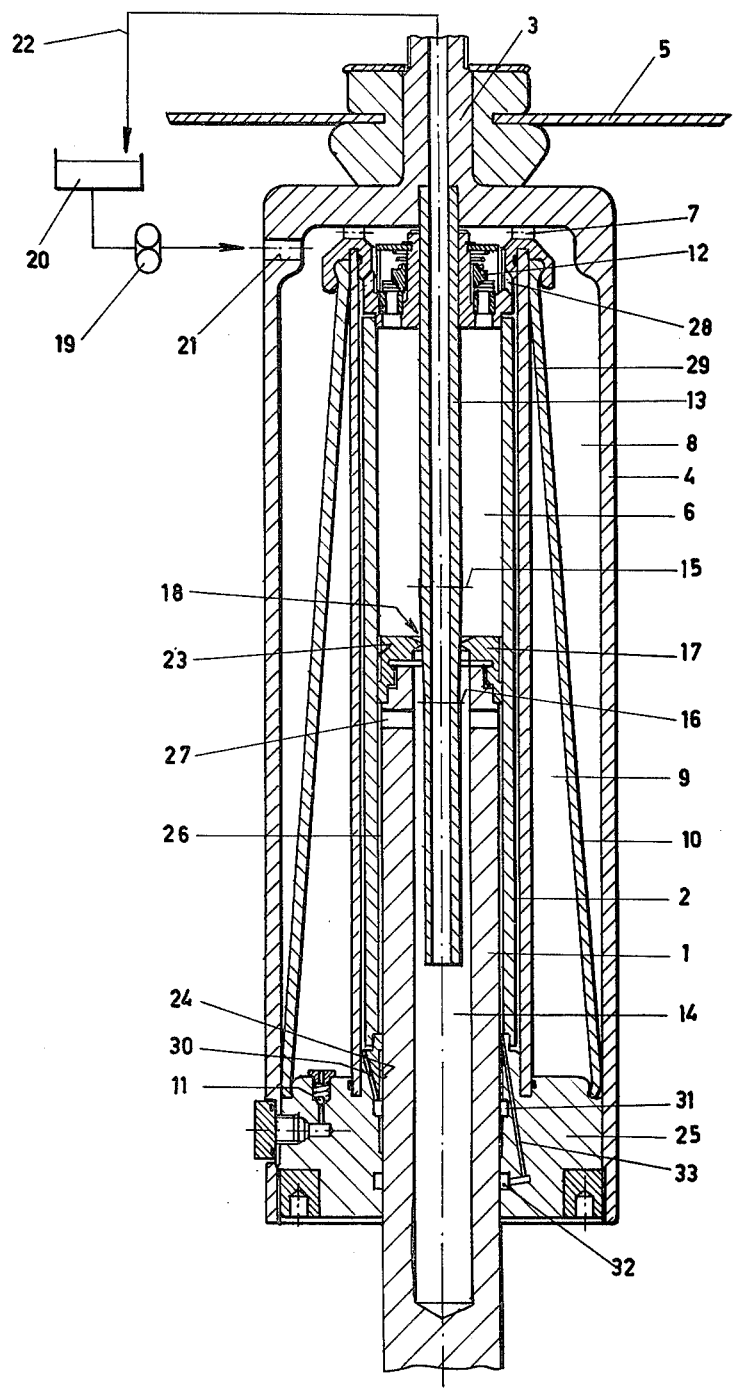

HYDRO-PNEUMATIC SPRING

BACKGROUND OF THE INVENTION

The invention relates to a hydro-pneumatic spring, consisting of a cylinder, a plunger movable in it, a chamber connected with the cylinder, containing a gas cushion and for the rest filled with liquid and means for controlling the amount of liquid present in the chamber.

Such springs are applied in vehicles in particular, because at the slight stiffness desired they do not have the disadvantage that between the empty and fully loaded condition of the vehicle there is a great difference in compression of the springs, as this compression is compensated by the liquid control. Consequently the springs have a great stiffness in respect of the average static load and a small stiffness in respect of the fluctuating, dynamic loads.

With spring systems of this type known in the art the liquid control is effected by means of valves, slides and such control members that are mechanically coupled with the plunger and that, dependent upon the position of the plunger in respect of the cylinder, connect the cylinder or the chamber connected with it with a fluid supply or discharge. These spring systems known in the art are, however, rather complicated and expensive and require much attendance and maintenance.

SUMMARY OF INVENTION

It is the object of the invention to meet this drawback by providing a hydro-pneumatic spring in which the control of liquid is effected by simple provisions at the spring itself, so that no separate control members, following the movements of the plunger need to be applied.

The spring according to the invention is, therefore, characterized in that the cylinder is connected to a device for the supply of a constant or substantially constant flow of liquid and, via a passage the flow resistance of which depends upon the position of the plunger in the cylinder, with a liquid discharge.

The constant liquid supply and the changeable passage provide an effective liquid control. For when at an increase of the load of the spring the plunger is pressed into the cylinder, the resistance of the passage increases and the discharge decreases, so that the liquid supply that remains the same causes an increase in the amount of liquid in the cylinder and expels the plunger out of the cylinder until again an equilibrium is reached, in which the liquid supply and discharge are equal to each other.

So as to obtain a constant liquid supply use is preferable made of a displacement pump driven at a constant speed, for instance electrically, which has a direct constant capacity, but also other types of pump or a consisting hydraulic system can be utilized, if a regulating valve known per se to keep the flow of liquid constant can be taken up in the supply.

According to a further characteristic of the spring according to the invention the changeable passage is formed by the gap between an auxiliary plunger and an auxiliary cylinder, of which the one is fixedly connected with the plunger and the other with the cylinder and which have a difference in diameter that differetiates in the direction of movement. In this way a robust, reliable construction of the spring is obtained.

Preferably, the passage is formed by the gap between a discharge tube coaxially mounted in the cylinder and a bore in the plunger, so as to give the spring a compact construction.

With a view to a long service life the spring according to the invention is further characterized in that the cylinder and the plunger form at least one hydrostatic bearing, which for its lubricant supply is connected with the cylinder and for its lubricant discharge with the bore in the plunger. The hydrostatic bearing provides a contactless guiding of the plunger in the cylinder, so that wear is entirely avoided, while because of the circumstance that for the operation of the spring a liquid supply and discharge are already present, the application of this type of bearing does not require special provisions. Preferably, this spring has both a bearing at the passage of the plunger in the cylinder and near the end of plunger, the latter having a greater diameter than the former, while the space thus formed between the bearings is connected with the bore in the plunger and has a cross-section whose area is substantially as large as that of the discharge tube.

These provisions result in the fact that on displacement of the plunger the change in volume of the space between the bearings and that of the bore in the plunger compensate each other, so that the movements of the plunger do not cause pulses in the liquid discharge duct.

Finally, the spring according to the invention is still characterized in that in the connection between the cylinder and the chamber a damping resistance has been provided. This resistance may consist of one or more openings that whether or not may have been provided with valves or other control members affecting the damping characteristic, which are also applied in hydraulic dampers.

DESCRIPTION OF THE PREFERRED EMBODIMENT

The invention is further elucidated below with reference to the drawing, which shows an example of a hydro-pneumatic spring for a vehicle.

Plunger 1 whose lower end is connected with the wheel axle of the vehicle, is telescopically movable in cylinder 2, which is connected with chassis 5 of the vehicle via top end 3 of housing 4.

Space 6 over plunger 1 is filled with oil and through openings 7 communicates with space 8 in housing 4, which contains gas cushion 9 and for the rest is also filled with oil. Gas cushion 9 is separated from the oil by membrane 10 consisting of flexible material and can be brought to the pressure desired by means of valve 11.

Movements of plunger 1 in cylinder 2 are transmitted by the oil in spaces 6 and 8 to gas cushion 9, which by this is more or less compressed and exercises an accordingly greater or smaller pressure, on to plunger 1 via the oil. Thus plunger 1, cylinder 2 and gas cushion 9 form a spring, which at a suitable choice of the volume of gas cushion 9 has the small stiffness for a comfortable road behaviour of the vehicle.

The oil that flows to and fro between spaces 6 and 8 passes, besides connecting openings 7, also damping openings 12 so that the plunger movements are braked. As customary with hydraulic dampers, damping openings 12 are provided with a control valve loaded by a spring so as to give the spring the damping characteristic desired for vehicles.

The small stiffness of the spring required for a comfrotable road behaviour of the vehicle has the drawback that the position of plunger 1 in cylinder 2 strongly depends upon the load condition of the vehicle. So as to remove this drawback the spring is provided with the level control to be described below.

Tube 13 is fitted centrally in cylinder 2 in upper end 3 of housing 4 and extends into central bore 14 of plunger 1. The part of tube 13 over section 15 has a greater diameter than the part under section 16 and between sections 15 and 16 tube 13 is conical. The opening in ring 17 at the upper end of plunger 1 just fits over the thicker part of tube 13 and forms with the conical part of tube 13 gap 18, whose width depends upon the position of plunger 1 in cylinder 2.

Gear pump 19, driven at a constant speed, carries a constant flow of oil from reservoir 20 through oil supply opening 21 into space 8. From space 6, via gap 18, bore 14, tube 13 and duct 22 oil is fed back to reservoir 20. The amount of oil flowing back depends upon the width of gap 18 and consequently upon the position of plunger 1 in cylinder 2.

If the amount of oil flowing away through gap 18 is not equal to the amount of oil supplied by pump 19, but greater, the amount of oil present in spaces 6 and 8 decreases, so that plunger 1 and cylinder 2 slide further into each other. As a result of this, gap 18 becomes narrower, so that the discharge of oil decreases, until the supply and the discharge balance. In this way for every load condition of the spring an equilibrium is reached in which ring 17 of plunger 1 is situated between sections 15 and 16 of tube 13.

The distance between sections 15 and 16 is a measure for the spring travel between the smallest and the greatest load of the spring and consequently the stiffness of the spring for static loads, whereas for dynamic loads at fast movements of plunger 1 in cylinder 2 the low stiffness continues to be. For this it is of importance that the capacity of pump 19 is so small that the level control does not react to the dynamic changes in the load.

So as to guide plunger 1 in cylinder 2 use has been made of hydrostatic bearings in which the flow of oil is maintained by the differences in pressure present in the spring. Upper bearing 23 is formed by cylinder 2 and ring 17, for which purpose the circumference of ring 17 has been provided with a pattern of grooves suitable for such bearings. Lower bearing 24 is formed by plunger 1 and ring 25, which seals housing 4 at the bottom; in this bearing 24 the pattern of grooves has been provided in ring 25.

Bearing 23 has a greater diameter than bearing 24. Space 26 present between bearings 23 and 24 as a result of this, communicates with bore 14 through channels 27 and has a section that is approximately as large as that tube 13, so that changes in volume of space 26 and that of the space in bore 14 neutralize each other when the plunger moves.

In bearing 23 the flow of oil is maintained by the high pressure in space 6 and the low pressure in space 26.

Bearing 24 communicates with the high pressure in space 8 via openings 7 and 28, the space between cylinder 2 and 29, channels 30 and groove 31. In this bearing 24 the flow of oil goes from groove 31 on the one hand towards space 26 and on the other hand toward groove 32, which via channels 33 communicates with space 26. The low pressure in groove 32, moreover, prevents the occurrence of oil leakage past plunger 1.

Upon application of the spring described for the wheel suspension of motorcars the level control of the springs does not only control differences in the load condition of the car, but also the tendency to incline in curves. A slow compensation, however, makes change the steering qualities of the car during and also after going through a long curve, which may be dangerous, whereas a sufficiently fast compensation requires a great capacity of pumps 19 and leads to an unacceptable use of energy. In view of this, the compensation of the inclination by the level control of the springs is preferably entirely eliminated by feeding the two springs, acting on one axle, by a common pump 19 and by applying the customary stabilizer bars for the required stability against inclination.

I claim:

1. A hydro-pneumatic spring consisting of a cylinder, a plunger movable in the cylinder, a fluid chamber connected with the cylinder containing a gas cushion and the rest of the chamber filled with liquid and means for controlling the amount of liquid present in the chamber, the said cylinder being connected with a device for the supply of a substantially constant flow of liquid and with a liquid discharge via a passage, the flow resistance of which depends upon the position of the plunger in the cylinder, the said plunger being provided with a central bore and a tapered discharge tube secured to the cylinder cooperating with said bore to control the oil flow through the passage.

2. A spring according to claim 1, wherein the passage is formed by the gap between an auxiliary plunger and an auxiliary cylinder, of which the one is fixedly connected with the plunger and the other with the cylinder and which have a difference in diameter that differentiates in the direction of movement.

3. A spring according to claim 1, wherein the passage is formed by a gap between the end of the discharge tube and the bore, which bore is conical over at least a part of its length.

4. A spring according to claim 1, wherein the passage is formed by the gap between the initial part of the bore and the buter surface of the discharge tube, which surface is conical over at least a part of the length of the tube.

5. A spring according to claim 1, wherein the cylinder and the plunger form at least one hydrostatic bearing, which for its lubricant supply is connected with the cylinder and for its lubricant discharge with the bore in the plunger.

6. A spring according to claim 5, wherein both at the passage of the plunger in the cylinder and near the end of the plunger a bearing has been provided, the latter having a greater diameter than the former, and wherein the space thus formed between the bearings is connected with the bore in the plunger and has a cross-section the area of which is substantially as great as that of the discharge tube.

7. A spring according to claim 1, wherein in the connection between the cylinder and the chamber a damping resistance has been provided.

* * * * *